July 18, 1939. P. NIELSEN 2,166,821
TRAFFIC WARNING DEVICE
Filed March 18, 1938
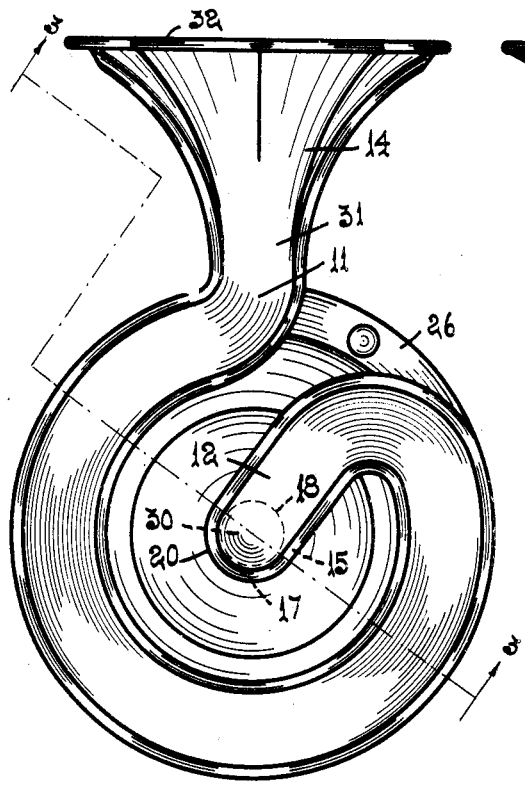
Fig.1.
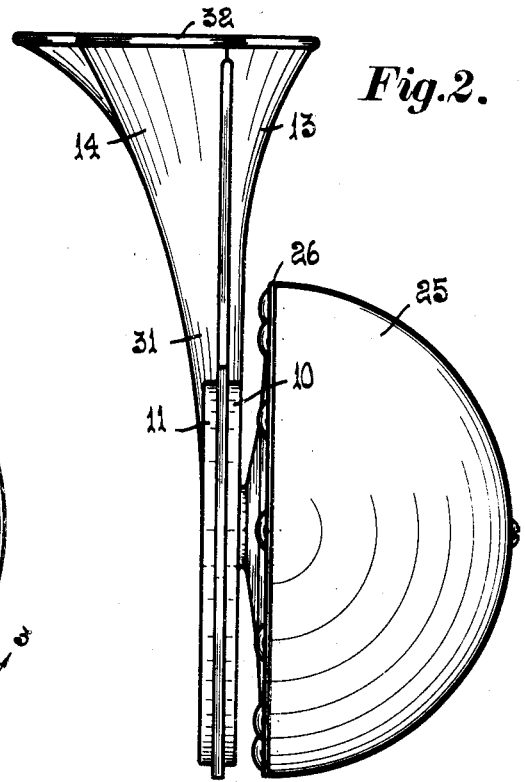
Fig.2.
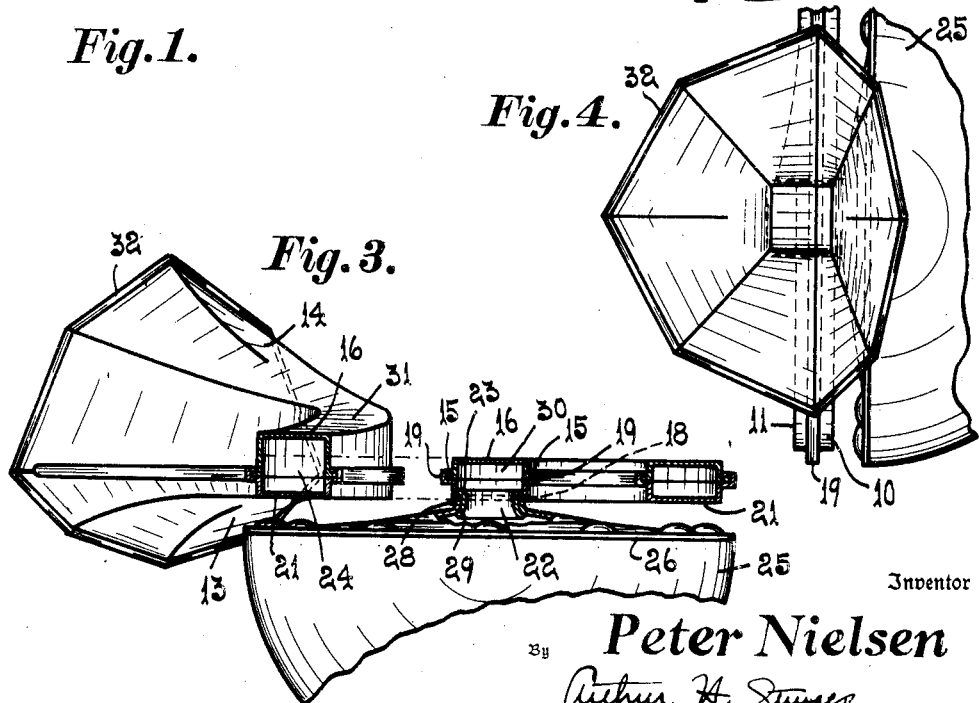
Fig.3.
Fig.4.
Inventor
Peter Nielsen
By Arthur H. Sturges
Attorney Patented July 18, 1939

2,166,821

UNITED STATES PATENT OFFICE 2,166,821

TRAFFIC WARNING DEVICE

Peter Nielsen, Omaha, Nebr., assignor to Jubilee Manufacturing Co., Omaha, Nebr., a corporation of Nebraska Application March 18, 1938, Serial No 196,698

1 Claim. (Cl. 181—27)

This invention relates to horns and more particularly to a sound resonator and sound projector having for an object to provide a device which, in use, will occupy a minimum amount of space under the hood of an automobile engine; which is adapted to be readily coupled with the housing of a sound producing mechanism for amplifying sound vibrations in an efficient manner and which is durable and of good acoustical characteristics.

A particular object of the invention is to provide an article manufactured of two piece sheet metal construction at a minimum of expense and which may be finished in any desired color, plated or painted as the consumer may desire, said article to be of light weight construction and compact for resisting vibration generated by the operation of a motor vehicle.

According to the present invention the horn is formed of separate parts which are joined together and are so constructed that the joining interlocks the parts, and the construction is such that it may be used for various types of automobile horns, trumpets and the like and may be readily attached to a sound box or other instrumentality from which the sound originates, being particularly adapted for use in connection with audible traffic warning signals carried by motor vehicles.

With the foregoing and other objects in view the invention will be more fully described hereinafter and will be more particularly pointed out in the claim appended hereto, reference being had to the accompanying drawing in which:

Figure 1 is a plan view of the resonator and the housing for a sound producing mechanism.

Figure 2 is a side view thereof.

Figure 3 is a fragmentary, partly sectional side view thereof taken on line 3—3 of Figure 1.

Figure 4 is an end view of the bell of the resonator, the sound producing housing being partially broken away.

Heretofore in this art the bell and flaring air column of a horn have been spun in one piece, and this is a comparatively expensive operation as the same is spun from a unitary blank which is drawn out by the spinning action. Also as heretofore practiced the air columns and bells of horns have been cast of comparatively heavy metal, the exposed surfaces of which require machining whereby such warning devices are comparatively expensive to manufacture and transport.

Referring now to the drawing for a more particular description the sound projector includes two oppositely disposed half portions 10 and 11 which are initially cut with a die from sheet metal. Initially said cut portions are flat, the main body portions of each being in the form of a spiral having medially disposed inner ends 12 and flared outer ends which project laterally from the spiral. The outer end 13 of the half portion 10 is preferably of lesser area than the flared outer end 14 of the half portion 11.

As best shown in Figure 3, the half portion 11 is die pressed to provide outwardly projecting, oppositely disposed flanges 15 which extend longitudinally of the spiral and bell portion 14, said pressing also providing a substantially C-shaped channel portion 16 between said flanges 15 together with forming the flared portion 14 of half bell shape, the inner end being provided with a flange portion 17 of arcuate shape in plan. The flange 17 is simultaneously formed integral with and extends radially and arcuately at the extreme inner end of the spiral between the longitudinally disposed side flanges 15 from one to the other of said side flanges, whereby a single integral flange is disposed substantially half way around said inner end and adjacent the longitudinal edges of said half-portion 11.

The half portion 10 is similarly treated and drawn to provide a half portion of a later described bell and an aperture 18 is formed through the half portion 10 adjacent the inner end of its spiral during said initial cutting. The oppositely disposed longitudinally extending side flanges 19 of the half portion 10 together with their radial integral flange 20 are provided of greater transverse width than the above mentioned similar single flange of the half portion 11. The half portion 10 is formed substantially C-shaped in cross section for providing a channel 21 between the side flanges thereof extending from the radial flange 20 of said side flanges 19 outwardly of the spiral. The radial flanges 20 and 17 are employed for sealing the extreme inner end of a later described air column.

A sheet metal sleeve 22 is inserted through the aperture 18 of the half portion 10 and provided with a die pressed peened flange 23 for securing it to the half portion 10, said aperture being of the same diameter as the outside diameter of the sleeve 22, as shown in Figure 3, whereby the sleeve, becomes locked to the member 10 for purposes later described.

The spiral half portions 10 and 11 are now juxtapositioned and their respective side flanges 15 and 19 abutted together with their respective end or radial flanges 17 and 20. The wider side flanges of the half-portion 10 are then die pressed and bent over the narrower flanges of the half portion 11, said wider side flanges being integral with the end flange 20 whereby a single flange is provided for the half-portion 10 which is substantially of U-shape in cross section, as shown in Figure 3, providing a channel in which the narrower flange of the half-portion 11 is snugly received for providing a closed joint for securing said spiral-channels together side by side locking said half portions together and providing a sound-projector with an air column or passageway 24, said abutted flanges all being locked together simultaneously, the end flanges 17 and 20 providing a seal for the inner end of the air column 24.

The sound producing mechanism used with the resonator may be of engine suction or electrically actuated type being contained within the housing 25. The housing is provided with a removable cover 26 having a radially disposed aperture, the annular wall 28 of which is outwardly flanged and provided with an inside diameter equal to the outer diameter of the sleeve 22 whereby the latter may be peened as at 29 for providing an annular flange for attaching the sleeve 22 to the removable cover 26 of the housing or sound-box 25 for operatively interlocking the sound-box and projector together.

In this manner it will be noted that the resonator may be readily attached to the housing of a sound producing mechanism, said resonator being of light weight construction requires no other support than the comparatively thin sheet metal sleeve 22.

During the pressing and drawing of the half bell portions 13 and 14, the latter may be provided with any desired ornamental configuration in plan such as the simulation of a lotus leaf shown in Figure 4 which has integral surfaces bent at an angle with respect to each other whereby when said half portions are joined together the bell 32 is of any ornamental appearance or circular or oval in plan as may be desired and in accordance with the die shape selected.

In operation the sound generated by the mechanism within the housing 25 enters the sound receiving chamber 30 at the inner end of the air column, the latter being flared outwardly from adjacent the base portion 31 of the bell to its outer edge 32 for facilitating an amplification of sound vibrations entering the sound chamber at the restricted inner end of the spiral air column, said vibrations following the convolutions of the passageway or air column 24 becoming broadcast through the end 32 of the bell for warning traffic. It will be noted that the employment of a pressed sheet metal resonator of light weight is practicable which, as described, uniformly lessens the production cost of resonators made in accordance with teachings herein.

It is obvious that various changes and modifications may be made in the details of construction and design of the above specifically described embodiment of this invention without departing from the spirit thereof, such changes and modifications being restricted only by the scope of the following claim.

I claim:

A traffic warning device for use under the hood of an automobile comprising a sound projector, said projector consisting solely of two integral half portions each having a flared end and a comparatively restricted end, each said half-portion being of spiral contour in plan, said restricted ends being disposed approximately medially of their respective spirals, said portions being approximately C-shaped in cross section for providing a spiral-channel on each thereof, said channels each defining a convolution of not less than 360 degeres, each said half-portion being provided with a single integral flange disposed substantially half-way around its said restricted end and adjacent both of the longitudinal edges thereof, one of said flanges being substantially U-shaped in cross section providing a channel thereon, the other said flange being snugly disposed in said channel of said U-shaped flange providing a closed joint for securing said spiral channels together side by side and an air column between said spiral channels, said projector having an aperture adjacent the restricted end thereof, a sleeve having an end disposed through said aperture and secured to said projector, a sound box of circular contour in plan, and a cover for said sound box, said cover being removably secured axially of said sound box and provided with an opening, the other end of said sleeve being disposed through said opening and secured to said sound box for operatively interlocking said sound box and projector together, said opening being medially of said cover for disposing the major portion of said projector cooperatively within the plane of said circular contour of said sound box for permitting said box and said major portion to occupy a minimum of space under said hood, said projector being entirely composed of sheet metal.

PETER NIELSEN.